United States Patent [19]

Ebermann et al.

[11] 4,446,408
[45] May 1, 1984

[54] CONTROL CIRCUIT FOR MACHINE TOOLS

[75] Inventors: Joachim Ebermann; Heinz Gräf; Siegfried Schleicher; Jürgen Uhlig, all of Karl-Marx-Stadt, German Democratic Rep.

[73] Assignee: Veb Werkzeugmaschinenkombinat "7 Oktober" Berlin, Berlin, German Democratic Rep.

[21] Appl. No.: 315,988

[22] Filed: Oct. 28, 1981

[30] Foreign Application Priority Data

Nov. 14, 1980 [DD] German Democratic Rep. ................................ 225189[U]

[51] Int. Cl.³ .......................................... G05B 19/26
[52] U.S. Cl. ................................. 318/600; 318/601; 318/604; 318/565
[58] Field of Search ............... 318/592, 600, 601, 604, 318/565

[56] References Cited

U.S. PATENT DOCUMENTS

| 3,576,986 | 5/1971 | Brickner | 318/592 |
| 3,742,326 | 6/1973 | Okuda et al. | 318/601 X |
| 3,795,851 | 3/1974 | Gage et al. | 318/602 |
| 4,305,029 | 12/1981 | Takahashi | 318/602 X |
| 4,315,198 | 2/1982 | Lin et al. | 318/601 X |
| 4,355,273 | 10/1982 | Du Vall | 318/592 X |

Primary Examiner—B. Dobeck
Attorney, Agent, or Firm—Michael J. Striker

[57] ABSTRACT

A control apparatus for machine tools is provided which comprises a pulsed digital difference detector having one input connected to a digital branch and having a second input connected to a follower drive and having an output, an adding register having its input connected to the output of the pulsed digital difference detector, an analog nominal value source having its control input connected to the output of the adding register, and an analog branch having an input connected to the analog nominal value source and having its output connected to the input of the follower drive. A drive motor for the tool provides a signal to the digital branch and a drive motor for the blank forms part of the follower drive. The drive motor for the tool is a d.c. motor coupled to a velocity pickup, and cooperating with means for withdrawing the tool and a distance pickup coupled to the drive motor for the blank.

24 Claims, 3 Drawing Figures

CONTROL CIRCUIT FOR MACHINE TOOLS

DESCRIPTION

BACKGROUND OF THE INVENTION

1. Field of the Invention

The present invention relates, particularly for gear cutting machines, to a control circuit providing a positive control of machine tools by means of a circuit provision for avoiding damages such as tool damages, workpiece damages and/or machine damages resulting from power failures or other emergency shut-offs.

2. Brief Description of the Background of the Invention Including Prior Art Tool machines with positive electronic controls an even wider application due to their flexibility in use with respect to the simpler adjustment to various assortments of workpieces and blanks, made possible with a control program, and without the time consuming changing of change wheels.

Besides the saving on preparation and completion times such machines can also be employed in manufacturing systems controlled by computers.

The drives necessary for electronically controlled machines of this kind (tool drive, workpiece drive and feed drive) are structurally fully independent one from the other and have the advantages of a direct constructive coordination very close to the work place. The disadvantage of the separate drives is the fact that they exhibit a finely differentiated run down behavior in case of interruptions such as for example power outages, drive failures, computer breakdowns, based on the very different moments of inertia of the components.

In the special case of a hobbing cutter the tool drive has a much larger moment of inertia as compared with the workpiece drive. During regular work the tool drive with a large moment of inertia provides the advantage of balancing the variations in the torque caused by interruptions in the cutting process. The tool drive therefor operates in the electronic positive control system as a master drive. The workpiece drive has a comparatively small flywheel effect and acts in an electronic control system as a controlled follower drive in the position to follow and to balance deviations generated by variations in the load and the like from the preset forced run ratio. The speed at which these variations of the load are recognized by the digital control and transformed into a correction of the desired value for the follower drive depends very much on the pulse frequency of the control. Therefore, in order to guarantee satisfactory production qualities very high pulse frequences (T 0.3 ms) are required resulting in high expenditures. For this reason, the realization of such a control is not considered with present day microprocessors having limited speed of operation.

Positive control devices are also known with a digital and an analog branch where a large dynamics is achieved despite a limited work speed of the digital branch. Upon a change in the transmission ratio both the analog as well as the digital transmission ratio controls both branches to be correspondingly changed, which is not easy in cases where high precission is required as in the hob cutting, for example. Therefore, frequency-voltage converters are employed for generation of an analog follower value whereby the adjustment of the transmission ratio has to be performed only in the digital branch. Thus upon failure of the digital branch also the adjustment of analog values is interrupted.

Upon a failure or outage of the power supply considerable damages are to be expected due to the varying run down times. The initially slightly reduced speed of rotation of the tool versus the nearly immediate braking of the workpiece caused by its small effective moments of inertia and the relatively large friction in the guide of the work results in a tangential penetration of the tool into the workpiece, that is into the teeth profiles of the gear wheel to be produced. Thus a destruction of the teeth of the workpiece engaged with the hob cutter results. The hob cutter is considerably braked by the continuously increasing depth of cut and chip thickness and can also be damaged in the process, that is a breaking out of the cutting edges or even a breaking of the hobbing cutter can occur.

If the energy of the slowing down tool drive is sufficient and the hobbing cutter is sufficiently stable, then also a complete shear of the hobbing cutter can occur. On the other hand, in cases of large machines the tool can penetrate to such a depth into the workpiece that the resulting forces render unuseable the machine including the bearing of the tool.

No provisions are made at the known controlled gear cutting machines which would avoid disturbances in case of a power outage or a computer breakdown. For the smaller and medium size gear cutting machines representing sizes for which electronic control provisions have been produced, the existing danger was accepted and in the case of a disturbance only the work piece became a reject, but based on the relatively small milling forces no machine damages occurred and only in exceptional cases did the tool break.

In equipping large gear cutting machines with an electronic controls, decisive economic disadvantages result in case of a disturbance, such that safety measures are required. In machines of this kind the costs of the tool are very high and in large workpieces there are invested time consuming premilling procedures requiring high production and material costs. For this reason, in the gear cutting of premilled large workpieces rejects have to be avoided.

In the case of turning machines having separate drives for the main spindle and the feed of the tool, but which operate in a certain relationship relative to each other via a control electronics such as, for example in thread cutting machines, there is already known a tool withdrawal provision as taught in German publication DE-OS No. 25 42 017, where upon interruption of the electrical energy the tool is withdrawn in order to avoid rejects in the workpieces being milled.

Such a tool withdrawal provision is not suitable for preventing the above mentioned possible damages in positively controlled gear cutting machines for, since in the recognition process of the power failure such as power outage or computer breakdown, an excessively long dead time occurs, which does not eliminate an endangering of the tool, the workpiece or the machine.

A further known possibility of a rapid withdrawal of the tool provides a fold-down tool support, which is tilted away upon a power failure and thereby removes the tool from cutting. This solution has to remain out of consideration in view of the fact that relieving of functionally important building modules from the flux of force is impossible for stability reasons, particularly at machines operating with large milling forces during rough-cutting.

SUMMARY OF THE INVENTION

Purposes of the Invention

It is an object of the present invention to provide a machine tool which protects the workpiece, the tool and the machine from damages upon power failures and/or computer breakdowns in the positive control and which prevents shearing of the tool.

It is another object of the present invention to provide positively controlled gear cutting machines where the tool drive motor controls as a master drive the workpiece drive motor acting as a follower drive, where a d.c.-motor is employed with a coupled speed pickup as a master drive, where the expenditure for the positive control is lowered and where upon power failure and disturbances the positive control between the master drive and follower drive are maintained even in case of power failures and accidental switching off of individual building groups.

It is a further object of the present invention to provide a machine tool, where upon a power outage or a computer breakdown the tool is removed from the engagement with the workpiece.

These and other objects and advantages of the present invention will become evident from the description which follows.

Brief Description of the Invention

The present invention provides a control apparatus for machine tools which comprises a digital branch having an output, a sequential drive having an output, a pulsed digital difference detector having an input connected to the digital branch and having a second input connected to the sequential drive and having an output, an adding register having its input connected to the output of the pulsed digital difference detector, an analog set point or follower data source having its control input connected to the output of the adding register and an analog branch having an input connected to the analog set point and having its output connected to the input of the sequential drive.

The control apparatus can be provided as a safety system for machine tools to avoid damages including tool damages, workpiece damages and machine damages. The machine tool can be a gear cutting machine or a hobbing cutter. The safety system can be laid out to overcome power failures or otherwise required emergency power shut-downs without damages. The follower drive can comprise an actual value increment output connected to the pulsed digital difference detector and the digital branch can have a follower set point increment output connected to an input of the analog branch. A drive motor for the tool can provide a signal to the digital branch and a drive motor for the blank can form part of the follower drive. The drive motor for the tool can be a d.c.-motor with a coupled speed pickup and a provision can be available for withdrawing the tool. A distance pickup can be coupled to the drive motor for the blank.

A switching unit is connected to the armature of the drive motor for the tool and to the provision for withdrawing the tool. A power failure monitor is connected to the switching unit for activating the same upon a power failure and the output of the velocity pickup is connected to the input of the analog branch. A motor is provided for positioning the tool and the same motor can be used for withdrawing and removing the tool. The armature of the motor for positioning the tool is connected via the switching unit to the armature for the drive motor for the tool. An auxiliary power supply is connected to the work piece drive and to the switching unit, a motor is connected to the power supply, a generator is connected to the motor and a flywheel mass is coupled to the motor. An auxiliary power supply monitoring unit is connected in parallel to the power supply monitor and the output of the auxiliary power supply monitoring unit is connected to the activating input of the switching unit.

The d.c.-motor is externally excited and the exciting winding of the d.c.-motor is connected to the auxiliary power supply and parallel to the main power supply via a switching contact controlled by the auxiliary power supply monitoring unit. A command circuit is activated by the power failure monitor and provides a connection to the auxiliary power supply. The switching unit can comprise thyristors or silicon controlled switches in each circuit branch connected to the armatures and the control inputs of the thyristors or silicon controlled switches are connected to the command circuit for being switched by the power failure monitor to the auxiliary power supply and by the auxiliary power supply monitoring unit to the main power supply. The controllable analog set point unit can exhibit integrating behavior. A multiplication member is disposed in the analog branch and the analog set point source and the multiplication member can be provided by a motor potentiometer. The sequential drive can comprise a distance pickup as an output unit which is connected to the pulsed digital difference detector.

There is also provided a method for controlling machine tools which comprises driving the machine tool with a drive motor for the machine tool, picking up the positions of the drive motor for the machine tool for generating a corresponding signal, feeding the signal to a digital control branch having an output, feeding the output of the digital control branch to the input of a difference detector, feeding the output of the difference detector to a set point source providing a set point, controlling a follower drive with the output from the analog branch and returning a distance pickup signal from the analog branch to the second input of the difference detector.

The speed of the drive motor for the machine tool can be picked up, and the resulting signal from the speed pickup is fed to a second input of the analog branch. The main power supply can be monitored and upon monitoring a failure an auxiliary power supply can be connected. Also the machine tool can be withdrawn from the blank upon monitoring of a power failure. The auxiliary power supply is monitored and upon detection of an auxiliary power supply failure the main power supply is connected to the corresponding circuits. A generator is coupled to and operated with the drive motor for the tool in order to generate power as an auxiliary power supply. A mass is rotated with the drive motor for storing mechanical energy and for transforming the stored mechanical energy into electrical energy upon a main power failure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the accompanying drawings in which are shown several of the various possible embodiments of the present invention.

DESCRIPTION OF PREFERRED EMBODIMENTS

Figure 1:
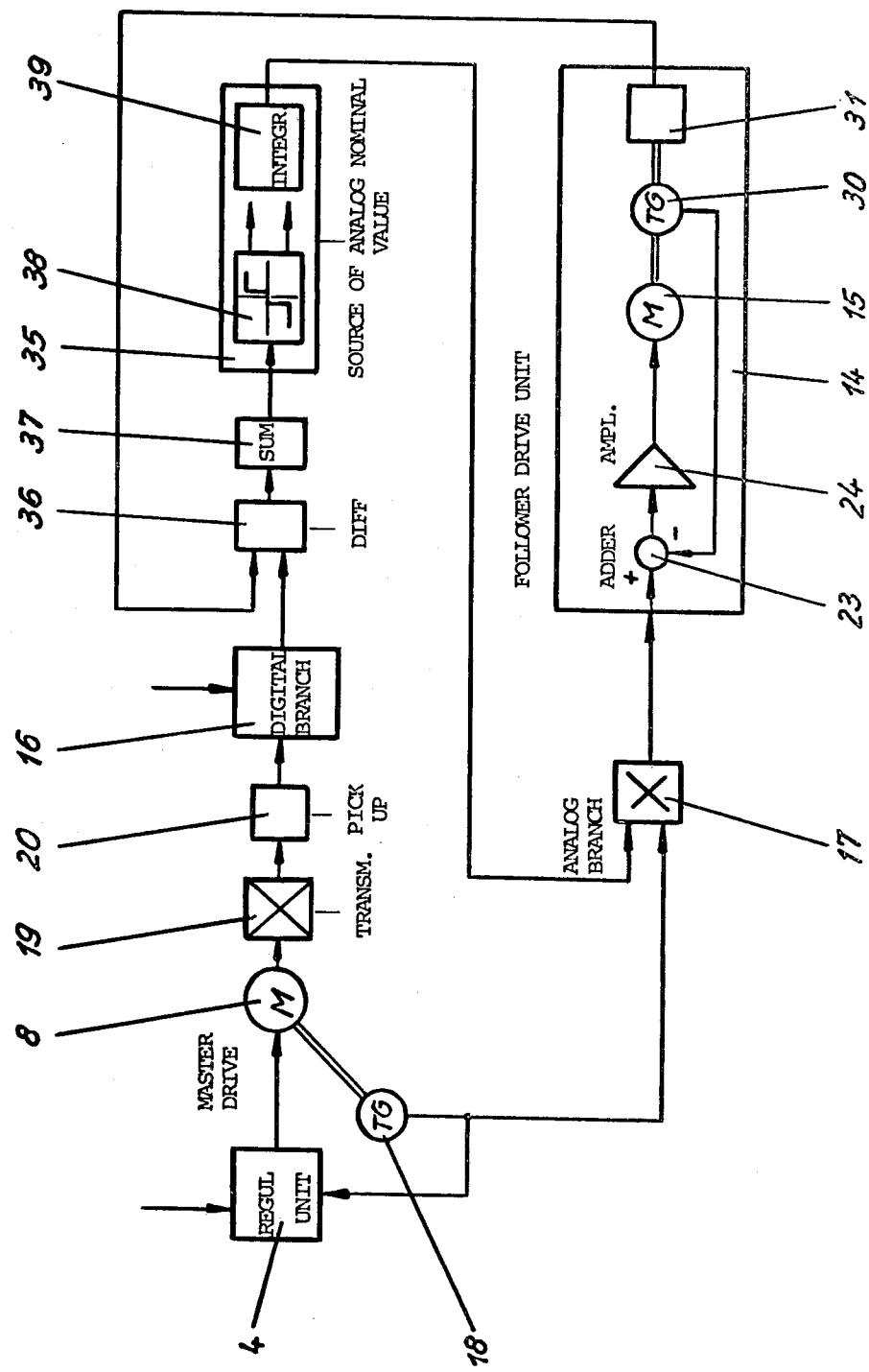
FIG. 1 is a block circuit diagram of the forced run control including circuitry for avoiding damages.

Referring now to FIG. 1 there is shown a tool drive motor 8 as a master drive connected to the power supply via a regulating unit 4. The tool drive motor 8 drives via a transmission 19 a distance pickup 20 and the output signals of the distance pickup are fed to the digital branch of a forced run control. The output of the digital branch 16 of the forced run control is connected to the input of a differentiator or difference detector 36, which in turn is connected via an adding or summing register 37 and a controllable analog nominal value source 35 to the input of an analog branch 17 of a forced run control. The output of a tachogenerator 18, which is coupled to the tool drive motor, is connected to the second input of the analog branch 17 of the forced run control.

The output of the analog branch 17 of the forced run control is connected to a drive unit 14 acting as a sequential drive. The drive unit 14 comprises a workpiece drive motor 15, which is coupled to a tachogenerator 30 and to a distance pickup 31. The output of the distance pickup 31 is connected as a second input to the difference detector 36. The negative sign output of the tachogenerator 30 is fed to an adding member 23, to which the output of the analog branch 17 of the forced run control is connected with a positive sign input of the adding member. The output of the adding member 23 is connected to the workpiece drive motor 15 via an amplifier 24. The controllable analog nominal value source 35 comprises a three point switch 38 connected to an integrator 39.

Figure 2:
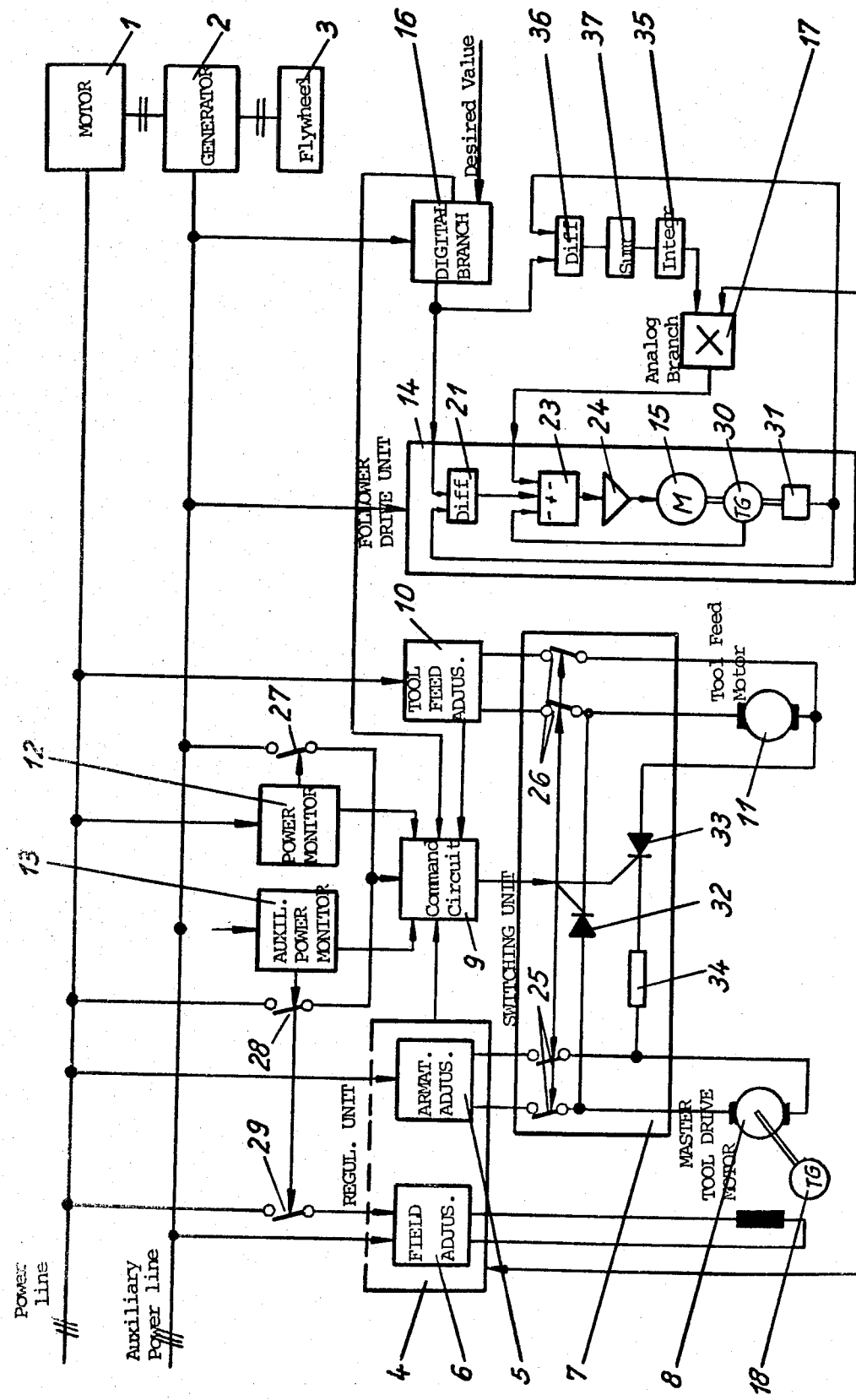
FIG. 2 is a block circuit diagram of this invention referring to the withdrawal of the tool and the monitoring of the power supply or the failure of respective building blocks.

Referring now to FIG. 2, there can be recognized additional details of the circuit provisions of the present invention relating to the tool withdrawal and the monitoring of the power failure and of device component breakdowns.

A motor 101 is connected to the power supply or to a power line and is coupled to a generator 102 and to a flywheel mass 103. The generator 102 provides a three phase auxiliary power supply. The regulating unit 104 for the tool drive motor 108 serving as a master drive is connected to the power line. The regulating unit 104 comprises a positioning element 105 for the armature and a control element 106 for the field of the tool drive motor 108.

Switching contacts 125 of a switching unit 107 are connected between the outputs of the positioning element 105 and the armature of the tool drive motor 108 and the switching contacts 125 are connected to a command circuit 109. In addition a adjuster 110 for a tool feed motor 111 is connected to the power line. Switching contacts 126 of the switching unit 107 are connected between the outputs of the adjuster 110 and the armature of the tool feed motor 111, which switching contacts 126 are also connected to the command circuit 109. The command circuit 109 is connected to the power line via a switching contact 127 of a power failure monitor 112 or respectively via a switching contact 128 of an auxiliary power supply monitoring unit 113.

The drive unit 114 and the digital branch 116 of the forced run control are connected to the auxiliary power supply. The outputs of the digital branch 116 of the forced run control, of the adjuster 110 and of the regulating unit 104, which upon interruptions in this group devices carry a signal, are connected to the command circuit 109. The control element 106 for the exciting of the tool drive motor 108 is connected on the power supply side to the auxiliary power supply or respectively at the main power supply by a switching contact 129 actuable by the auxiliary power supply monitoring unit 113. The switching unit 107 comprises connecting lines between the armature of the tool drive motor 108 and the armature of the tool feed motor 111 via in each case a thyristor 132,133 in each armature current branch.

A resistor 134 is disposed in the circuit of the armatures switched together for adapating the maximum current to the maximum armature voltage of the tool drive motor 108. The control inputs of the thyristors 132, 133 are connected to the command circuit 109.

The circuit connections to the drive unit 114, to the digital branch 116 and to the analog branch of the forced run control correspond to the circuit provisions already described in connection with FIG. 1. The reference numerals in FIG. 2 correspond to those of FIG. 1, if 100 is added to the respective numeral of FIG. 1. Only a difference detector 121 was preposed to the input of the drive unit 114 and the inputs of the difference detector 121 are connected to the output of the distance pickup 131 and to the output of the digital branch 116 of the forced run circuit.

Figure 3:
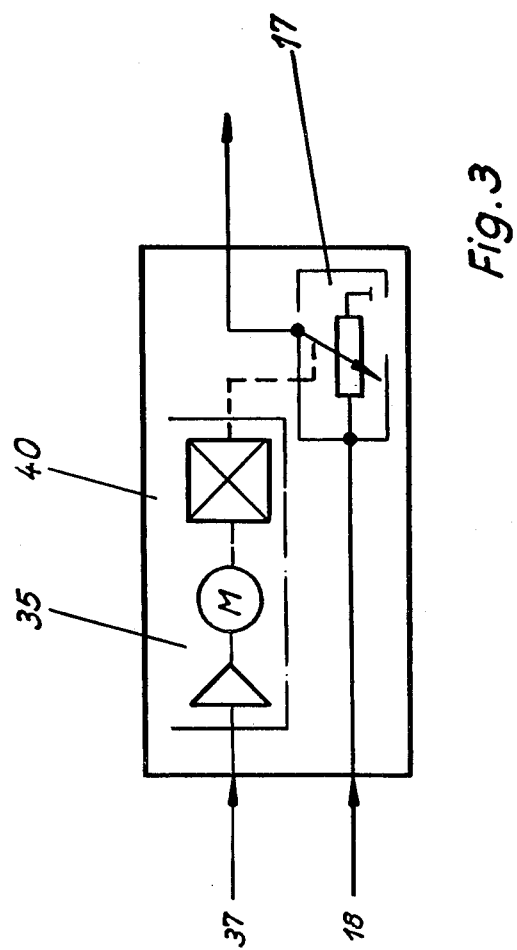
FIG. 3 is a circuit provision of the analog branch of the forced run control including the analog set point source.

The controllable analog nominal value source 135 and the analog branch 117 of the forced run control comprise in a preferred embodiment (FIG. 3) a motor potentiometer 140. The positioning motor of this motor potentiometer 140 encompasses the function of the analog nominal value source 135 and the potentiometer itself takes the function of the analog branch 17 of the forced run control.

The mode of operation of the switching circuitry is as follows: The drive unit 114 as a follower drive receives its desired or nominal values via the analog branch 117 of the forced run control from the tachogenerator 118 of the tool drive motor 108 serving as a master drive. In parallel to this, digital desired or nominal values of the follower are formed by the distance pickup 120 coupled to the tool drive motor 108 in connection with the digital branch 116 of the forced run control and the digital follower nominal values are compared with the follower actual values, which are provided by the distance pickup 131 of the workpiece drive motor 115. The difference of these digital signals as obtained in the difference detector 136 is employed for the setting or adjusting of the transmission ratio between the master drive and the follower drive in the analog branch 117 of the forced control circuit via the adding or summing register 137 and the integrator 135. By way of this control of the drive unit 114 acting as follower drive, a high dynamics is obtained despite the limited speed of operation of the digital branch 116. The essential feature of this circuit provision comprises that upon failure of the digital branch 116 of the forced run control such as occurs in case of a computer breakdown, the forced run of the follower drive is maintained with the nominal value as present at the time of failure.

With each recognized failure of a device section there is required an emergency shut down of the machine despite a momentarily error-free positive run, since upon an assumed breakdown of the digital branch 116 of the forced run control a continuously increasing residual error would build up. On the other hand, upon failure of the power line the forced run can anyway be maintained only for a short time based on the present kinetic energy of the drives, and for avoiding of an incorrect engagement of the hobbing cutter with the workpiece additional measures are required for the maintenance of the power supply of the follower drive and its control as well as of the tool withdrawal.

For this purpose the command circuit 109 is activated upon a power supply or phase failure and/or with a computer breakdown or a control outage, which command circuit 109 in turn fires the thyristors 132, 133 in the switching unit 107 and at the same time opens the switching contacts 125, 126 via a falling contactor. Thereby the tool drive motor is separated from its positioning unit 105 and the tool feed motor 111 from its adjuster 110 and they are connected together via the thyristors 132, 133 such that the tool drive motor 108 drives the tool feed motor 111 as a generator and moves the latter in the direction of the tool withdrawal from the workpiece.

The power supply for the adjusting members which are necessary for the full functioning of the forced run control and the drives is provided by the auxiliary power supply, which is based on the generator 102 coupled to the flywheel mass 103 so that in case of a power outage it maintains with certainty for such a time until the separation of tool and workpiece is effected. The generator 102 generates a three phase current the operation for the auxiliary power supply, since the drive unit 114 requires alternating voltage 3×380 Volts for the workpiece drive motor 115. The monitoring of the power supply line is provided by the power failure monitor 112, which upon a power failure assures, besides the activation of the command circuit 109, also the power supply to the command circuit 109 via the switching contact 127 at the auxiliary power supply. In a similar fashion the auxiliary power supply monitoring unit 113 monitors the auxiliary power supply and assures by actuation of the switching contacts 128 or respectively 129 the power supply to the command circuit 109 or respectively of the exciting winding of the tool drive motor 108 via the final control element 106. Based on the kinetic energy contained in the rotating masses of the motor 101, of the generator 102 coupled to the motor 101 as well as the coupled flywheel mass 103, the generator 102 provides still sufficient energy for the short time maintenance of the forced run of the motor 101 even if power supply is connected, and for the supply voltage of the digital and analog branches 116, 117. Since also the digital branch 116 of the forced control can fail for example upon computer breakdown, the feedback of the output voltage of the tachogenerator 118 to the analog branch 117 of the forced run control provides a basic desired value for the rotation speed regulating circuit of the workpiece drive motor 115 follower, which assure in case of a disturbance a sufficient forced run control of the follower drive (workpiece drive motor 115) by the master drive (tool drive motor 108). The digital branch 116 of the forced run control needs only to provide during regular operation a partial nominal value, which balances the deviations in position caused by changes in the loading and the like.

The present circuit can be employed as a protective circuit, which allows the feed of the tool or respectively the engagement of tool and workpiece only then if with running tool spindle, that is with running tool drive motor 108, the analog branch 117 of the forced run control is such adjusted for the basic nominal value that the position deviation in the position regulating circuit remains below a preset value, that is the digital partial nominal value has to be close to zero.

The following errors can be recognized by the circuit according to the present invention and neutralized so that they cannot result in disturbance damages at the tool, the workpiece or the machine:

Phase or power supply line failure (including failure of the auxiliary power supply);
Failure of the tool or work piece drive;
Failure of the electronic forced run control;
Failure of the adjustment and control;

The embodiments of the invention assure by making available energy for the device units participating in the forced run a safe protection of tool, workpiece and machine elements from disturbances and damages. There is also energy available for presetting nominal value for the workpiece drive motor 115, the nominal value being derived from the voltage of the tachogenerator 118 coupled to the tool drive motor 108. Energy is also available for the separation of tool and workpiece by to connecting the tool feed motor 111 in the direction of the withdrawal of the tool to the tool drive motor 108 which operates as a generator and thereby a rapid braking of the tool drive motor results.

It will be understood that each of the elements described above, or two or more together, may also find a useful application in other types of system configurations and machine tool products differing from the types described above.

While the invention has been illustrated and described as embodied in the context of a control apparatus for machine tools, it is not intended to be limited by the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention.

What is claimed as new and desired to be protected by Letters Patent is set forth in the appended claims:

1. Control apparatus for machine tools comprising
   a digital branch having an output;
   a follower drive having an output;
   a pulsed digital difference detector having one input connected to the digital branch and having a second input connected to the follower drive and having an output;
   an adding register having its input connected to the output of the pulsed digital difference detector;

an analog nominal value source having its control input connected to the output of the adding register; and an analog branch having an input connected to the analog nominal value source and having its output connected to the input of the follower drive.

2. The control apparatus for machine tools according to claim 1 wherein the control apparatus is provided as a safety system for machine tools to avoid damages including tool damages, workpiece damages and machine damages.

3. The control apparatus for machine tools according to claim 2 wherein the machine tool is a gear cutting machine.

4. The control apparatus for machine tools according to claim 3 wherein the safety system is laid out to overcome power failures or otherwise required emergency power shut-downs without damages.

5. The control apparatus for machine tools according to claim 1 wherein the follower drive has an actual value increment output connected to the pulsed digital difference detector and where the digital branch has a nominal value increment output connected to an input of the analog branch.

6. The control apparatus for machine tools according to claim 1 further comprising a drive motor for the tool and providing a signal to the digital branch; and a drive motor for the blank forming part of the follower drive.

7. The control apparatus for machine tools according to claim 6 wherein the drive motor for the tool is a d.c.-motor with a coupled velocity pickup; further comprising a provision for withdrawing the tool; and a distance pickup coupled to the drive motor for the blank.

8. The control apparatus for machine tools according to claim 7 further comprising a switching unit connected to the armature of the drive motor for the tool and connected to the provision for withdrawing the tool;

a power failure monitor connected to the switching unit for activating the same upon a power failure and where the output of the velocity pickup is connected to the input of the analog branch.

9. The control apparatus for machine tools according to claim 8 further comprising a motor for positioning the tool and used for removing the tool; and the armature of the motor for positioning the tool is connected via the switching unit to the armature for the drive motor for the tool.

10. The control apparatus for machine tools according to claim 8 further comprising an auxiliary power supply connected to the work piece drive and to the switching unit;

a motor connected to the power supply;

a generator connected to the motor; and a flywheel mass coupled to the motor.

11. The control apparatus for machine tools according to claim 10 further comprising an auxiliary power supply monitoring unit connected in parallel to the power supply monitoring unit and the output of the auxiliary power supply monitoring unit is connected to the activating input of the switching unit.

12. The control apparatus for machine tools according to claim 11 where the d.c.-motor is externally excited and the exciting winding of the d.c.-motor is connected to the auxiliary power supply and parallel to the main power supply via a swithcing contact controlled by the auxiliary power supply monitoring unit.

13. The control apparatus for machine tools according to claim 12 further comprising a command circuit activated by the power failure monitor and connected to the auxiliary power supply; wherein the switching unit comprises thyristors in each circuit branch connected to the armatures and the control inputs of the thyristors are connected to the command circuit for being switched by the power failure monitor to the auxiliary power supply and by the auxiliary power supply monitoring unit to the main power supply.

14. The control apparatus for machine tools according to claim 1 wherein the analog nominal value source is controllable and exhibits integrating behavior.

15. The control apparatus for machine tools according to claim 14 further comprising a multiplication member disposed in the analog branch.

16. The control apparatus for machine tools according to claim 15 wherein the analog nominal value source and the multiplication member are provided by a motor potentiometer.

17. The control apparatus for machine tools according to claim 1 wherein the follower drive comprises a distance pickup as an output unit which is connected to the pulsed digital difference detector.

18. A method for controlling machine tools comprising driving the machine tool with a drive motor for the machine tool;

picking up the positions of the drive motor for the machine tool for generating a signal;

feeding the signal to a digital control branch having an output;

feeding the output of the digital control branch to the input of a difference detector;

feeding the output of the difference detector to source providing a nominal value;

applying the nominal value into an analog branch for providing an output;

controlling a follower drive with the output from the analog branch;

returning a distance pickup signal from the analog branch to a second input of the difference detector.

19. The method for controlling machine tools according to claim 18 further comprising picking up the speed of the drive motor for the machine tool;

and feeding the picked up speed signal to a second input of the analog branch.

20. The method for controlling machine tools according to claim 18 further comprising monitoring the main power supply; and connecting an auxiliary power supply upon a monitored power failure.

21. The method for controlling machine tools according to claim 20 further comprising withdrawing the machine tool from the blank upon monitoring of a power failure.

22. The method for controlling machine tools according to claim 20 further comprising monitoring the auxiliary power supply; and connecting upon a monitored auxiliary power supply failure the main power supply to the corresponding circuits.

23. The method for controlling machine tools according to claim 20 further comprising
operating a generator with the drive motor for generating power as an auxiliary power supply.

24. The method for controlling machine tools according to claim 20 further comprising
rotating a mass with the drive motor for storing mechanical energy and transforming the stored mechanical energy into electrical energy upon a main power failure.

* * * * *